April 2, 1940.  G. A. LYON  2,196,019
BUMPER GUARD
Filed June 4, 1938   2 Sheets-Sheet 1
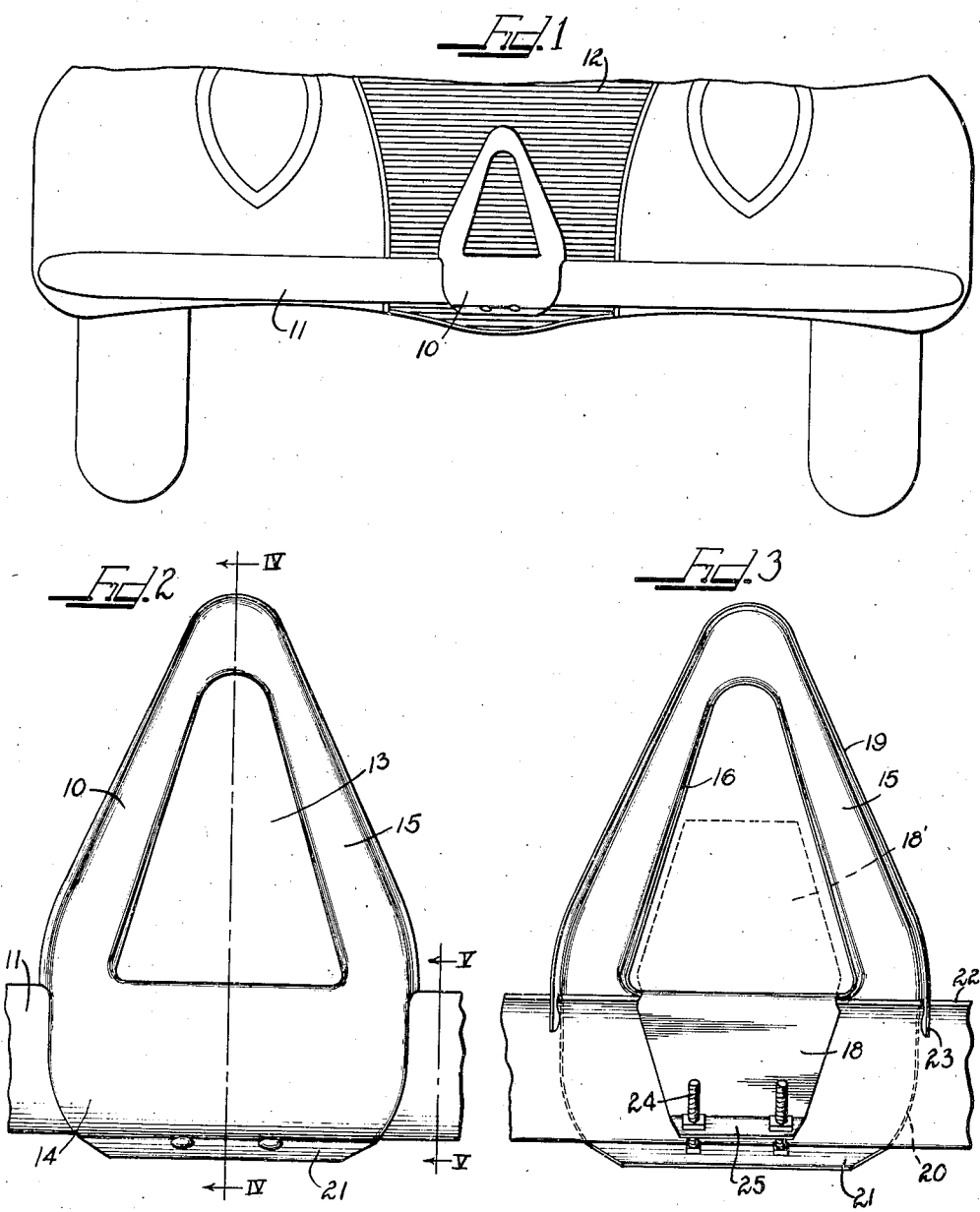
Inventor
GEORGE ALBERT LYON

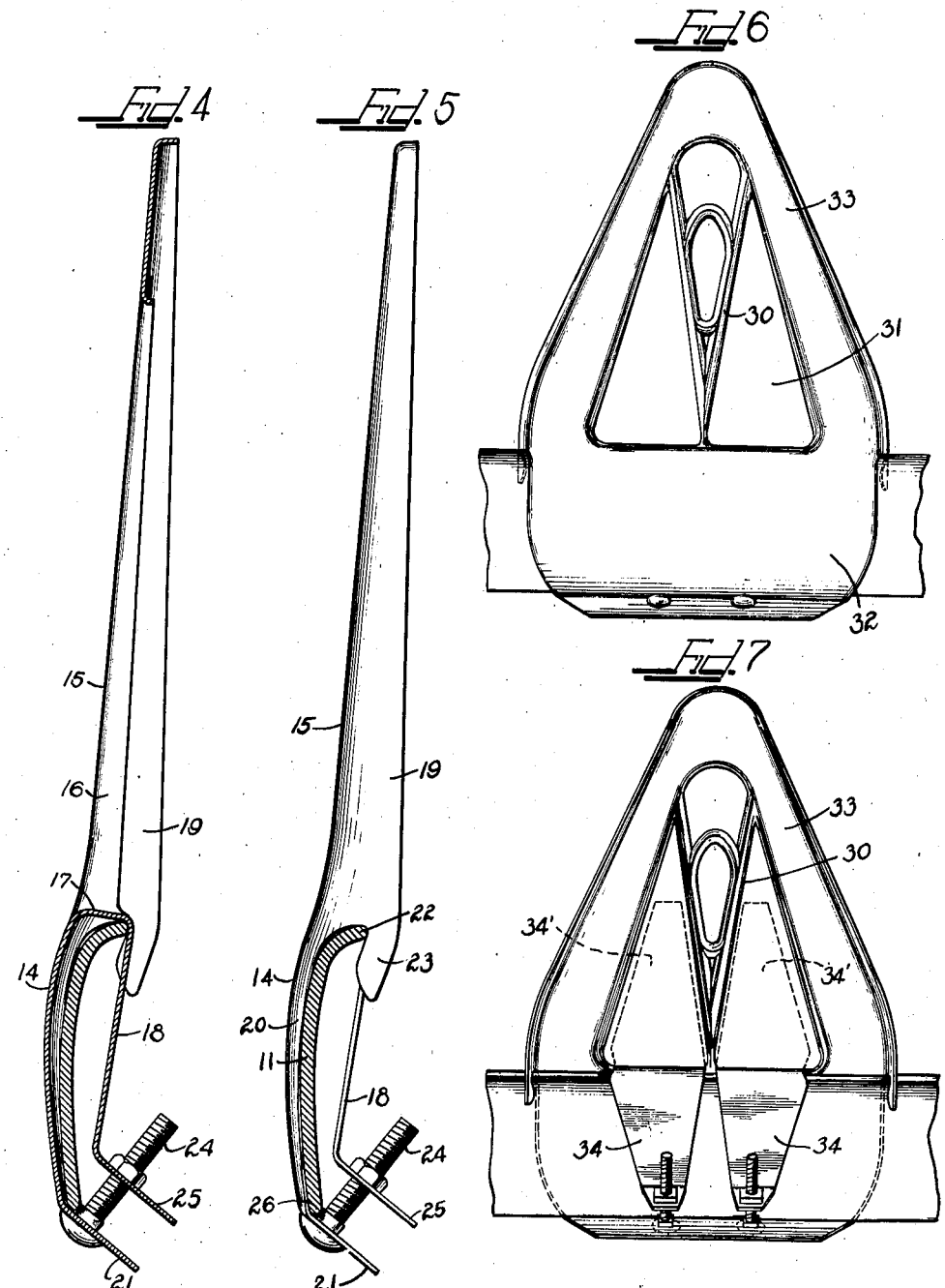

Patented Apr. 2, 1940

2,196,019

UNITED STATES PATENT OFFICE 2,196,019

BUMPER GUARD

George Albert Lyon, Allenhurst, N. J.

Application June 4, 1938, Serial No. 211,775

5 Claims. (Cl. 293—55)

This invention relates to an ornamental and useful grille guard or vertical bumper extension and more particularly to an ornamental bumper accessory which is adapted to be readily bolted into position on a vehicle bumper to increase the protection afforded by the latter.

Practically all motor vehicles in use at the present time are provided with front and rear impact members which are commonly known as "bumpers." Although a standard height above the ground has been established for these impact members or bumpers and practically all motor vehicles are provided with bumpers placed according to that standard, it has been found that in many collisions between vehicles the front bumper of one vehicle will pass clear under the rear bumper of the other. This occurs especially when one vehicle is following another and does not stop quite as fast as the vehicle ahead.

As the vehicles stop, the shift of weight caused by applying the brakes takes some of the weight off of the back wheels of each vehicle and puts it on the front wheels. This causes the rear of the front vehicle to rise up and the front of the back vehicle to nose down and throws the bumpers so far out of line that they miss each other completely.

In vehicles with old fashioned fenders leaving the front of the wheels exposed and with radiators mounted directly above the front axle, this failure of the bumpers to meet caused no serious results because the rear bumper of the front vehicle, after passing over the front bumper of the rear vehicle, would hit its front tires which could absorb the blow practicaly as well as a bumper.

In present day vehicles with front fenders that extend down in front of the wheels and with expensive cast radiator grilles mounted ahead of the wheels, this failure of the bumpers to meet caused by the rearing up and nosing down of the vehicles has more serious results. The fenders are crushed against the tires and the grille is broken so that what would have been a minor collision if the bumpers had met becomes an expensive accident. This can be prevented by providing a guard extending up from the front bumper so as to catch any other bumper about to pass over it. In order that such a guard may be commercially satisfactory, it is necessary that it be strong enough to withstand any ordinary shock or collision, and it must be easy to install on a bumper. In addition, it must be economical to manufacture.

It is an object of this invention to provide a novel impact member possessing the above highly desirable characteristics.

Another object of this invention is to provide a novel auxiliary impact member to be mounted on the usual form of vehicle bumper which is economical to manufacture and which is rugged and reliable in use.

A further object of this invention is to provide a novel form of bumper accessory having novel means thereon for detachably securing the accessory to a vehicle bumper.

In its broader aspects, this invention consists of a sheet metal bumper guard having one or more legs projecting above or below the bumper from a body or base portion lying on the face of the bumper and either as wide as or wider than the leg or legs. The projecting leg or legs of the guard are provided with deep strengthening flanges, some or all of which may extend across the face of the bumper as flanges at or near the ends of the base portion of the guard. Means are provided for hooking onto one edge of the bumper, preferably the edge past which the leg or legs project. These means may comprise hooks formed in the flanges of the projecting leg or legs or one or more flaps of metal extending around the edge of the bumper from the face of the guard at one or both sides of each of the projecting leg or legs. For securing the guard onto the bumper, holes are provided in one or more of the parts that hook onto the edge of the bumper and one or more bolts or other fastening means extend from these holes to a flange or other part of the guard projecting back at the other edge of the bumper. If it is desired, these bolts may have their sides bearing against the edge of the bumper and extend at an angle to the plane of the bumper, and the part to which these bolts are connected may be a somewhat flexible flap rather than a rigid flange so that tightening of the bolts causes them to swing towards the bumper and clamp tightly upon its edge. The projecting leg or legs may be one or several in number, but I have found that two legs provide an attractive and serviceable guard, especially if they are joined together at their extremities so as to form a U-shaped or preferably a V-shaped arrangement.

The above briefly discussed novel features of my invention, as well as its other novel features, are set forth more precisely and in more formal and technical language in the appended claims and can best be understood by considering one or two of the preferred forms of the invention described below and shown in the accompanying drawings, in which:

Figure 1 is a front elevational view of one of the preferred forms of my invention mounted on a vehicle bumper and showing its position with respect to the vehicle.

Figure 2 is a front elevational view of the form of the invention shown in Figure 1 and a portion of the bumper upon an enlarged scale.

Figure 3 is a view similar to Figure 2, but showing the rear of the bumper guard and bumper instead of the front.

Figure 4 is a sectional view on the line 4—4 of Figure 2.

Figure 5 is a sectional view on the line 5—5 of Figure 2.

Figure 6 is a front elevational view of a second form of my invention mounted on a bumper.

Figure 7 is a back elevational view of the form of the invention shown in Figure 6.

The embodiment of this invention illustrated in Figures 1 to 6 includes an ornamental auxiliary impact member or bumper accessory 10 which is centrally mounted on a main bumper or impact member 11 in a position to protect the radiator grille 12 at the front of a car. The bumper accessory or guard 10 has the general shape of an isoceles triangle with an open triangular center 13 and is formed of a single piece of sheet metal. The base 14 of the triangle fits in front of the face of the bumper 11 and the two legs 15 of the triangle converge up from the ends of the base 13.

The central triangular aperture 13 is surrounded by a deep flange 16 which projects to the rear of the main portion of the guard and which serves to strengthen the upwardly projecting legs 15. The flange 17 at the bottom of the opening is prolonged into a flap 18 which extends from the top of the base portion 14 of the guard down behind the bumper 11 and forms part of the means by which the guard is clamped in place. As is shown by the dotted lines 18' in Figure 3, the flap 18 is formed from the metal originally lying between the upstanding portions 15 of the guard.

The outside of the guard is also provided with a flange 19, 20, 21 extending entirely or substantially entirely around it, and performing a plurality of functions. The portions 19, and 20 of this flange extending along the outside of the legs 15 and the ends of the base portion 14 serve to strengthen the legs, particularly against forces tending to bend them back. The portions of the flange 19, 20 where it crosses the top edge 22 of the bumper 11 are formed into hooks 23 fitting around the edge 22 to help in securing the guard in place. At the bottom of the guard, the flange 21 extends back under the bumper 11, as shown very clearly in Figures 4 and 5, and is provided with holes through which pass bolts 24 which hold the bumper guard in place. The bolts extend upwards through these holes and through holes in a flange 25 on the end of the flap 18 which extends down over the top 22 of the bumper. The sides of the bolts 24 lie against the lower edge 26 of the bumper, and the bolts themselves are at an angle of about forty-five degrees to the surface of the back of the bumper. Because of this and the fact that the flap 18 to which the upper ends of the bolts connect is thin enough to bend a little, the flap 18 and the bolts 24 tend to swing into one plane like the two parts of a toggle when the bolts are tightened. This swings the bolts 24 up and forward towards the bumper 11, and the sloping sides of the bolts in contact with the lower edge 26 of the bumper force the bumper forwards into tight engagement with the flanged body or base portion 14 of the bumper guard and upwards into tight engagement with the hooks 23 formed in the side flanges 19, 20 and with the flange 17 extending over the top of the bumper.

The form of my invention shown in Figures 6 and 7 is generally similar to the form shown in Figures 1 to 5 and differs from it chiefly in that an ornamental insignia or monogram 30 is provided in the otherwise open central portion 31 of the guard. The insignia 30 is composed of stamped sheet metal integral with the rest of the guard and, in the particular form shown, extends up from the central part of the base portion 32 to points near the upper ends of the upwardly projecting legs 33. Instead of a single flap 18 as in the form of the invention shown in Figures 1 to 5, two flaps 34 are formed, one from each part of the metal originally at each side of the insignia 30 as shown by the dotted lines 34' in Figure 7. The insignia 30 is preferably made narrow at the bottom so that the two flaps 34 are wide where they join the body 32 of the bumper guard so as to give a good distribution of stress.

From the above description and the accompanying drawings, it can be seen that I have provided a strong, simple and attractive bumper accessory that is economical to manufacture and easy to install. While I have shown and described in detail only two of the preferred embodiments of the invention, it is obvious that many other forms of the invention may be made, such as smaller guards for attachment in downwardly projecting position on the rear bumper, for example and the invention is not limited to the forms mentioned or shown herein, but includes all modifications falling within the scope of the appended claims.

I claim as my invention:

1. A bumper accessory comprising a sheet metal member shaped to lie against the face of a bumper and having at least one leg placed so as to project beyond said face, said leg being formed with flanges having notches adapted to hook onto one edge of said bumper and said member being formed with a portion in back of the other edge of said bumper, and a fastening element extending through said portion and provided with means for tight connection to a portion of said member projecting around said first mentioned edge of the bumper.

2. A bumper accessory comprising a sheet metal member shaped to lie against the face of a bumper and having at least one leg placed so as to project beyond said face, said leg being formed with flanges having notches adapted to hook onto one edge of said bumper and said member being also provided with a flap constructed and arranged to extend around said edge of said bumper towards the other edge and with a flange constructed and arranged to extend in back of said other edge, and a fastening element connecting said flap to said last mentioned flange.

3. The combination of a bumper bar and a guard mounted thereon, said guard comprising a body portion lying against the face of said bar, a guard portion projecting beyond one edge of the bumper bar and having spaced flanges, said flanges having hook portions fitting said edge of the bar, a flap extending around said edge of the bar around the back thereof and towards the other edge, a flange on said body portion extending back past said other edge of said bumper bar, and fastening means connecting said flap and said last-mentioned flange behind said bumper bar.

4. The combination of a bumper bar and a guard mounted thereon, said guard comprising a body portion lying against the face of said bar, a guard portion projecting beyond one edge of the bumper bar and having spaced flanges, said flanges having hook portions fitting said edge of the bar, a flexible flap connected to said body portion and extending across from said edge of the bar towards the other edge thereof, said flap lying in back of and spaced from the bumper bar, a flange on the body portion extending back past said other edge of the bumper bar, and a bolt connecting said last mentioned flange and said flap, said bolt extending at an acute angle to the bumper bar and the side of said bolt near said flange being in contact with said other edge of the bumper bar whereby tightening of the bolt will tend to swing said bolt towards said first edge and force said bumper body portion of said guard and said hook portions of said strengthening flanges tightly against said bumper bar.

5. The combination of a bumper bar and a guard mounted on its face, said guard having a portion projecting beyond one edge of said bar, a second and flexible portion extending around said edge and towards the other edge of said bumper bar, said flexible portion lying in back of and spaced from the back of the bumper bar, and a third portion extending back past said other edge and spaced from said second portion, and a bolt extending through said second and third portions, the side of said bolt being in contact with said other edge of said bar and said bolt extending at an acute angle to the back of said bar so that tightening of said bolt will result in swinging said bolt towards said bar and tightly clamping said other edge of said bar between the side of said bolt and the main portion of said guard.

GEORGE ALBERT LYON.